United States Patent [19]

Knudsen et al.

[11] 4,347,401
[45] Aug. 31, 1982

[54] GAS-FILLED CABLE WITH COMPOSITE CONDUIT OF LOW CARBON STEEL AND ALUMINUM AND HAVING PARTICLE TRAPS

[75] Inventors: Niels Knudsen, Lerum; Veikko Orpana, Oxelösund; Matti Wisur, Oxelösund; Olov Wärulf, Oxelösund; Hakan Bergqvist, Mölndal; Raoul Afzelius, Älvängen, all of Sweden

[73] Assignee: SPACAB AB, Oxelösund, Sweden

[21] Appl. No.: 185,919

[22] PCT Filed: Feb. 8, 1979

[86] PCT No.: PCT/SE79/00025

§ 371 Date: Oct. 9, 1979

§ 102(e) Date: Oct. 2, 1979

[87] PCT Pub. No.: WO79/00607

PCT Pub. Date: Aug. 23, 1979

[30] Foreign Application Priority Data

Feb. 9, 1978 [SE] Sweden ................................. 7801543

[51] Int. Cl.³ .......................... H01B 9/06; H02G 5/06
[52] U.S. Cl. .................................... 174/14 R; 174/27; 174/106 R; 174/126 CP
[58] Field of Search .................... 174/14 R, 16 B, 27, 174/28, 29, 36, 68 C, 99 R, 99 B, 106 R, 106 D, 108, 109, 126 CP; 307/147; 138/143

[56] References Cited

U.S. PATENT DOCUMENTS

| | | | |
|---|---|---|---|
| 2,589,700 | 3/1952 | Johnstone | 174/106 R |
| 2,890,263 | 6/1959 | Brandes et al. | 174/29 |
| 3,515,939 | 6/1970 | Trump | 174/14 R X |
| 3,602,633 | 8/1971 | Miller et al. | 174/126 CP X |
| 3,715,453 | 2/1973 | Aupoix et al. | 174/106 R X |
| 3,767,837 | 10/1973 | Graybill | 174/27 |
| 3,898,367 | 8/1975 | Nakata | 174/14 R |
| 3,919,456 | 11/1975 | Floessel | 174/27 |

OTHER PUBLICATIONS

Parker, G. H., *Wire*, "Clad Metals in Cable Construction", Mar. 1966, pp. 405, 406, 408, 455 and 456.

*Primary Examiner*—Laramie E. Askin
*Attorney, Agent, or Firm*—Cushman, Darby & Cushman

[57] ABSTRACT

A gas-filled cable having low heat emission and low power loss and being used for the transmission of high-voltage electric current. The cable includes one or more conductors which are axially spaced in position relative to each other by means of supporting insulators inside an enclosing conduit which is filled with an insulating gaseous medium. In such a cable the conduit comprises on one hand a cylindrical metal sheath of plain or low-alloy merchant steel having a carbon content of less than 0.6% and on the other hand a metal shield of non-magnetic material fixed inside the sheath and having a low specific electrical resistivity. The metal shield has a plurality of openings therethrough spaced along its length for forming particle traps.

6 Claims, 3 Drawing Figures

GAS-FILLED CABLE WITH COMPOSITE CONDUIT OF LOW CARBON STEEL AND ALUMINUM AND HAVING PARTICLE TRAPS

The present invention concerns a gas-filled cable intended for the transmission of high-voltage electric current and consisting of one or more conductors, these being held axially in position by means of supporting insulators inside an enclosing conduit filled with an insulating gaseous medium.

According to known practice, gas-filled cables may be used for both underground and surface transmission of electric current up to about 1,000 kV. By comparison with overhead power-lines carrying the same voltage, gas-filled surface cables have proved to have a greater current-carrying capacity and at the same time to be less liable to operational disturbances. However, a major disadvantage of such cables has, until now, been the high cost of manufacture, the chief contributor to this being the outer conduit of the cable itself which must be so constructed as to keep power losses at a reasonable level. Laboratory tests have previously indicated that carbon steel is an unsuitable material for cable conduits, one reason for this being that its use is associated with large losses of power.

In cables buried underground a further difficulty is met with in the heat emitted from the cable, which must be carried off through the ground. This causes the ground in the vicinity of the cable to dry out, leading in turn to reduced thermal dissipation capacity in the ground itself and a possible deterioration of the natural environment in which the cable is buried-plant-life, for instance, may be harmed. In order to avoid the ground drying-out and the side-effects which this may involve, the temperature of the conduit of a gas-filled cable should not rise above approx. 40° C.; and in view of the danger of thermal collapse of the insulating medium present within the cable itself, the maximum operational temperature inside the ducts should not be in excess of 105° C. It is therefore essential that the heat developed in the cable be kept as low as possible and that the conditions in the vicinity of the cable be kept constantly favourable to thermal conduction. In previous types of gas-filled cables using carbon steel in the conduit, induced currents in the conduit cause heat releases greater than in cables having a conduit of e.g. aluminium, copper or other non-magnetic material.

A method known previously in connection with cooling systems for superconducting cryogenic cables uses a cable conduit comprising an outer sheath of high-alloy steel consisting of an iron/nickel alloy containing 30–45% nickel, and an inner lining or shield of e.g. aluminium. By this means, losses in the outer conduit can be kept down, while the conduit itself functions as a transport system for a cooling medium which may be liquid helium, He, or nitrogen gas, $N_2$.

The main objective of the invention is to reduce heat emission from gas-filled cables at the same time as power losses are kept low and the total manufacturing costs are such that the cable type will be able to compete on the market. In gas-filled cables of the type described in the introductory paragraph this is rendered possible in that the conduit comprises a cylindrical metal sheath of magnetic material enclosing a metal shield of non-magnetic material having low resistivity. Here it has proved feasible to construct an outer metal sheath of plain or low-alloy merchant steel with a carbon content of less than 0.6%, preferably approx 0.2%. Like the sheath, the shield may also be cylindrical; a suitable thickness for this has been found to be approx. 8–30% of the total thickness of the conduit, although 12–20% is to be preferred.

Another objective of the invention is to achieve a cable of the type under discussion in which the insulation between the conduit and the conductors running inside the conduit is maintained at a constant high level of efficiency throughout the life of the cable, for it has been found that in gas-filled cables of the conventional type small particles, of e.g. metal, often remain inside the cable after it has been brought into service. These particles may be concentrated to certain places and in some cases cause deterioration of the insulation and result in a short-circuit between the conductors and the conduit. However, by providing the cable with so-called particle traps by the method indicated in the following description and claims, it becomes possible to confine these particles to spaces in the cable where they are unable to disturb its functioning. An arrangement of this type is particularly simple and offers many advantages if based on the construction principles of this invention.

The invention will now be described in greater detail by reference to two embodiments illustrated in the appended drawings, in which the gas-filled cable and its components are not drawn to scale.

Figure 1:
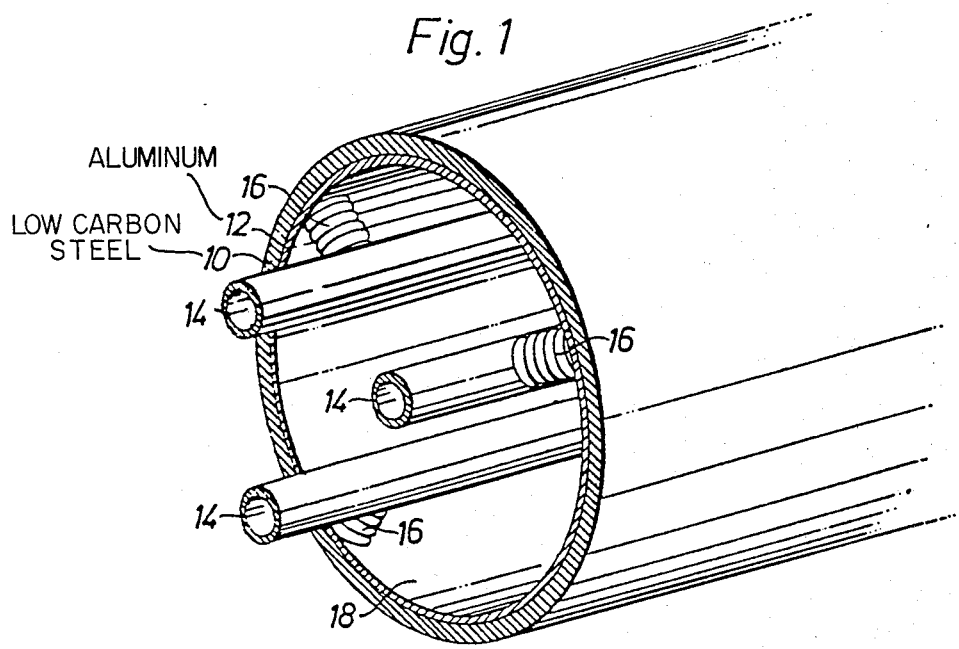
FIG. 1 shows a perspective view of a section through a gas-filled cable for three-phase alternating current constructed as per the invention.
Figure 2:
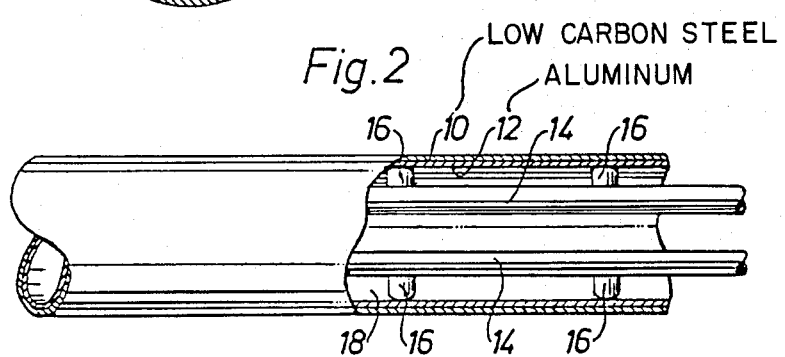
FIG. 2 shows a side view of the cable illustrated in FIG. 1, part of the cable being shown cut away.

The gas-filled cable illustrated in FIGS. 1 and 2 comprises an outer conduit 10, 12 in which three conductors 14 are held in position by means of supporting insulators 16. The space 18 between the conductors 14 and the conduit 10, 12 is filled with an insulating gaseous medium, sulphur hexafluoride, $SF_6$, being a suitable gas, kept at a pressure of approximately three atmospheres. Here it may be worth mentioning that while the electrical insulation properties of the gas improve with increase of pressure, its condensation point rises at the same time and with it the danger of dielectric breakdown. In practice, therefore, the pressure of the gas must be adapted to the minimum working temperature of the cable. For reasons of cost, a mixture of gases consisting of 50% sulphur hexafluoride, $SF_6$, and 50% nitrogen gas, $N_2$, is possibly the insulating medium to be preferred for this purpose.

In the embodiments illustrated, the conduit of the cable comprises an outer sheath 10 fitting snugly round a metal lining or shield 12. A suitable material for the outer sheath 10 is plain carbon steel, while aluminium may be used to advantage for the shield 12. By using a combination of this type, the depth of penetration into the outer sheath 10 by the electromagnetic field, produced by the current carried by the conductors is reduced, and hence losses through the conduit are reduced as well.

As is apparent from FIG. 1, the shield 12, which, like the enclosing sheath 10, is cylindrical, fits snugly inside the sheath. The shield 1 may be of sheet metal and may be formed as it is drawn into the sheath so that it becomes a tight-fitting lining to the sheath itself. After forming, the edges of the shield may be united by welding inside the enclosing sheath. Evidently the shield 12 may also consist of a separate pipe introduced directly into the enclosing sheath 10, in which case the shield 12 may be pressed tightly against the sheath by e.g. expansion.

In the version illustrated in FIGS. 1 and 2, the outer sheath 10 is formed of 10 mm thick sheet steel, the carbon content of which is about 0.2%. The diameter of the conduit is 800 mm. The shield 12 is of aluminium plate, 2 mm thick, and the complete conduit encloses the three conductors 14, these also being of aluminium and consisting of pipes having a diameter of 100 mm and walls 5 mm thick. How the conductors are to be arranged in relation to one another is shown in principle in FIG. 1, although it should be noted that their exact position will be dependent on the voltage later to be carried by the cable.

The three conductors 14 are held in position by conventional supporting insulators 16 located inside the gas-filled conduit at a suitable distance from each other along each individual conductor. The insulators consist of separate elements, the ends of which are securely fastened to the cable conduit 10, 12 and the conductor 14 in question by e.g. screws. In order to facilitate assembly of these insulators 16 in the cable, it is also possible to unite them with the conductors so that separate units are formed which may be individually introduced into the conduit 10, 12.

Figure 3:
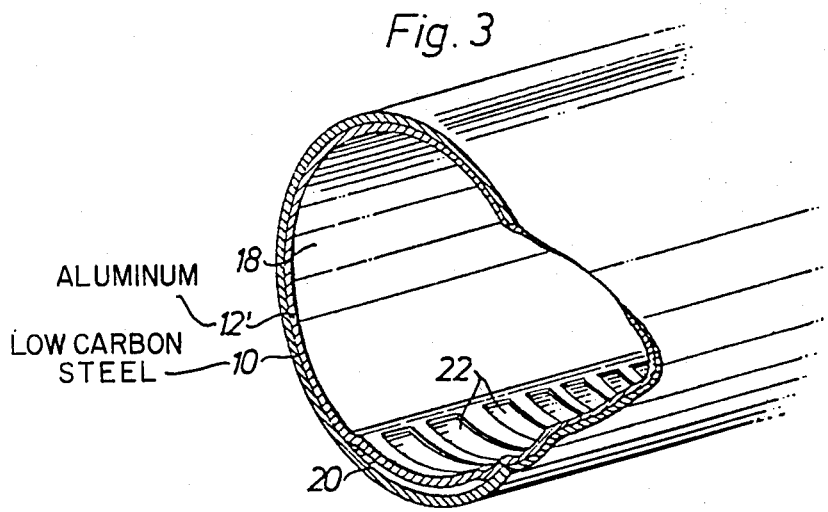
FIG. 3 shows a modified version of the cable illustrated in FIG. 1 in which, for the sake of clarity, the conductors and insulators have been omitted.

In the embodiment of the cable conduit 10, 12' illustrated in FIG. 3, an outer sheath 10 and a shield 12' of essentially the same type as the version shown in FIGS. 1 and 2 are used. However, in this case the shield 12' has been modified so as to leave a space 20 between the shield 12' and the sheath 10 along part of the inside surface of the sheath 10. This is achieved by grooving the shield 12' in an axial direction before it is inserted into the sheath 10. The grooved part of the shield should face downwards while the cable is being used. The space 20 between the shield 12' and its enclosing sheath 10 mentioned above will then face downwards and should provide a clearance of one or a few mm between the two. The shield 12' is pierced by a number of slot-shaped holes 22 spaced at intervals along the length of the cable which form a passage between the space 20 and the interior 18 of the cable itself. Any particle remaining inside the cable after assembly will be set in motion by the electrostatic field generated by use of the cable, but under the influence of gravity will gradually be made to "fall" through the slots 22 and remain trapped in the space 20 between the two parts of the conduit, that is between the outer sheath 10 and the shield 12', which are both of the same potential.

Modified versions of the gas-filled cable described above are naturally feasible within the terms of the invention. It may thus sometimes prove advantageous to make the shield of copper, while the breadth of the particle traps may be varied as desired. The holes, too, may be of various shapes; and the shield itself, evidently, need not consist of a tubular pipe but could conceivably take the form of a helical strip.

We claim:

1. A gas-filled cable having particle trap means and intended for the transmission of high voltage electric current, said cable including at least one electric conductor, an enclosing conduit comprising a cylindrical metal sheath and a metal shield of non-magnetic material fitting inside said sheath, a plurality of supporting insulators for supporting the at least one electric conductor within said conduit spaced from the interior of said metal shield, said metal shield forming a tube-like lining for said metal sheath, said metal shield having a plurality of openings therethrough spaced therealong defining said particle trap means, said interior of said cable being filled with an insulating gaseous medium.

2. The gas-filled cable as claimed in claim 1 wherein said metal shield is so constructed as to shield only part of the interior of said cable from said outer metal sheath.

3. The gas-filled cable as claimed in claims 1 or 2 wherein said metal shield comprises a helical strip.

4. The gas-filled cable as claimed in claims 1 or 2 wherein said metal sheath is made from a plain low-alloy merchant steel having a carbon content no greater than 0.6%.

5. The gas-filled cable of claim 4 wherein said carbon content is approximately 0.2%.

6. The gas-filled cable as claimed in claims 1 or 2 wherein said metal shield is of aluminum.

* * * * *